Feb. 23, 1954

T. A. HARRIS 2,669,837

MEANS FOR SYNCHRONIZING AIRCRAFT ENGINES

Filed Sept. 18, 1950

2 Sheets-Sheet 2

Inventor
T. A. Harris

UNITED STATES PATENT OFFICE

2,669,837
MEANS FOR SYNCHRONIZING AIRCRAFT ENGINES

Thomas Alfred Harris, Edgbaston, Birmingham, England, assignor to Joseph Lucas Limited, Birmingham, England Application September 18, 1950, Serial No. 185,349

Claims priority, application Great Britain October 10, 1949

1 Claim. (Cl. 60—39.15)

This invention has for its object to provide means for synchronising the engines (jet-engines or gas turbines) of dual or multi-engined aircraft during acceleration, and thereby minimise or obviate such differences in the rate of acceleration as might cause dangerous yawing during take-off or manoeuvring.

Figure 1:
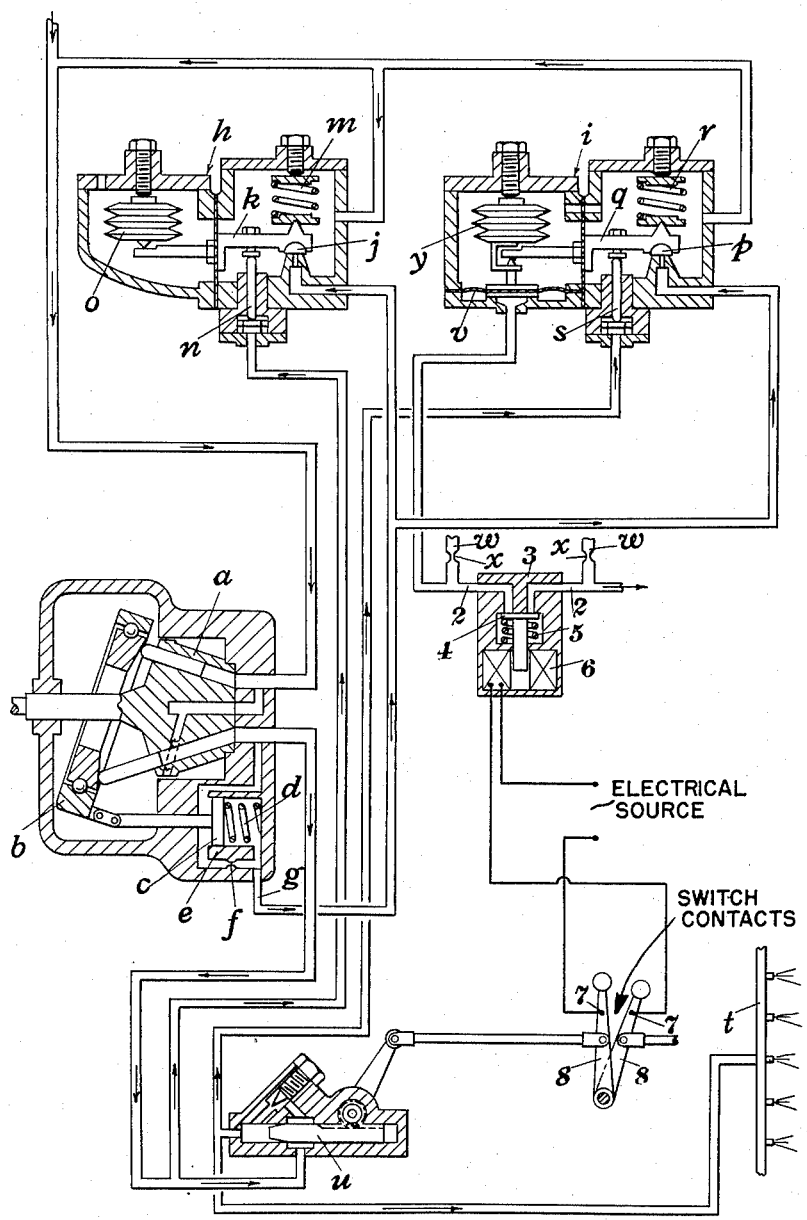
Figure 2:
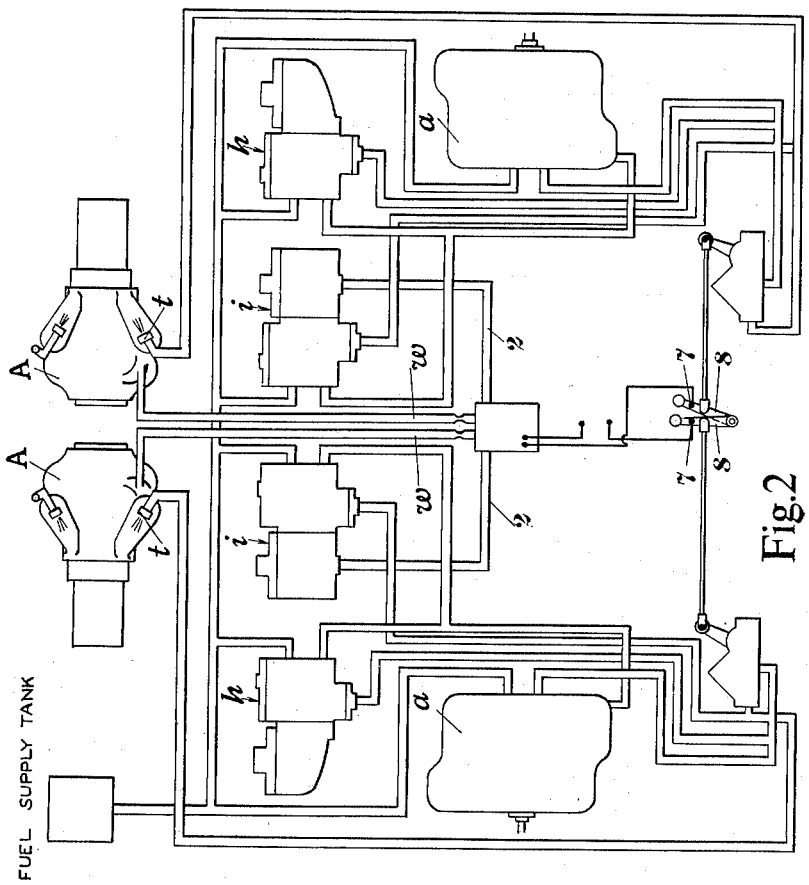

The invention comprises the combination with the blower-air passages associated with the means for controlling the fuel-air ratio, of a balancing passage, a valve for controlling the said passage, an electromagnet for actuating the valve, and a switch for controlling the electromagnet. In the accompanying drawings:

Figure 1 illustrates diagrammatically an example of a liquid-fuel supply and control system of an engine having combined therewith in accordance with the invention, means for effecting the desired balance with another engine equipped with a similar supply and control system; and Figure 2 is a diagram illustrating both of the engines and the associated systems, the engines being of the jet-propulsion or gas turbine type.

In the drawings, the liquid-fuel supply and control system for each engine A comprises a known form of variable-delivery fuel pump $a$ of the swash plate type, the swash plate $b$ being angularly adjustable for varying the pump output by a known form of servo mechanism, comprising a piston $c$ connected to the swash plate, and a spring $d$ acting on one side of the piston, the latter being slidable in a cylinder $e$ the ends of which are in communication by way of a restricted orifice $f$. Liquid is supplied to the left hand side of the piston by the pump, and a passage $g$ extending from the right hand end of the cylinder is controlled by a barometric device indicated generally by $h$, and a fuel-air ratio device indicated generally by $i$, both of which devices are of known form.

Each barometric device comprises a vent valve $j$ for controlling outflow from the servo-cylinder $e$ through the passage $g$. The valve $j$ is carried by a lever $k$ which is subject to the control of a spring $m$, a plunger $n$ responsive to the pressure of the liquid fuel discharged by the pump, and a barometric capsule $o$ which is responsive to variations of atmospheric air pressure.

Each fuel-air ratio device comprises a vent valve $p$, for controlling outflow from the servo-cylinder $e$ through the passage $g$. The valve $p$ is carried by a lever $q$ which is subject to the control of a spring $r$, a plunger $s$ which is subject to the pressure of the liquid fuel supplied to the burner $t$ under the control of a manually operable throttle $u$, a diaphragm $v$ subject to blower-air pressure supplied from the blower (incorporated with and driven by the corresponding engine A) through a passage $w$ having therein a restriction $x$, and an evacuated capsule $y$.

In carrying the invention into effect as shown, the two blower-air passages $w$ of the engines are interconnected by a balancing passage 2 situated between the restricted orifices $x$ and the fuel-air ratio devices $i$, and in this passage is arranged a control valve 3. This valve includes a closure member 4 which is normally held in contact with its seating by a spring 5. For moving the closure member away from its seating against the action of the spring there is provided an electromagnet 6.

The electromagnet 6 is supplied with current from any convenient source under the control of a switch. In the example illustrated the switch comprises a pair of contacts 7 respectively carried on a pair of manually operable levers 8 which actuate the two throttles $u$ of the two engines A, the two contacts being adapted to control the electromagnet circuit by mutual engagement. When the throttles are moved by the levers into predetermined positions for accelerating the engines, the contacts close the circuit of the electromagnet and so cause the balancing passage 2 to be opened. The action of the two fuel-air ratio devices $i$ is thereby equalised, and this equalisation causes the engines to be synchronised.

When it is required to control the engines A independently, movement of either lever 8 relatively to the other will separate the contacts 7, and so allow the valve to close, thereby isolating from each other the blower-air passages $w$.

The invention is not, however, limited to the example described, as it may be applied in essentially the same manner for controlling more than two engines.

Having thus described my invention what I claim as new and desire to secure by Letters Patent is:

In combination with the fuel systems of at least two air-craft engines of the jet-propulsion or gas turbine type to which air is supplied by blowers, which systems each comprise a liquid fuel pump, a fuel-air ratio control device responsive at least in part to blower-air pressure, and a throttle for controlling the flow of fuel from the pump to the corresponding engine, means for synchronizing the engines during acceleration thereof, comprising passages which form parts of the systems for conducting air from the blowers to the fuel-air ratio control devices respectively, a balancing passage communicating with the blower-air passages, a normally closed control valve in the balancing passage, an electromagnet for opening the valve, a switch for controlling the electromagnet, and means for simultaneously actuating the switch and the throttles so that the valve is opened under the action of the electromagnet when the throttles assume predetermined positions for accelerating the engines.

THOMAS ALFRED HARRIS.

References Cited in the file of this patent

UNITED STATES PATENTS

| Number | Name | Date |
|---|---|---|
| 2,086,101 | Stoller | July 6, 1937 |
| 2,095,991 | Lysholm | Oct. 19, 1937 |
| 2,103,274 | Sanford | Dec. 28, 1937 |
| 2,381,429 | Bell | Aug. 7, 1945 |
| 2,381,934 | Spanogle | Aug. 14, 1945 |

FOREIGN PATENTS

| Number | Country | Date |
|---|---|---|
| 578,311 | Great Britain | June 24, 1946 |